US009800115B2

(12) United States Patent
Yamaguchi et al.

(10) Patent No.: US 9,800,115 B2
(45) Date of Patent: Oct. 24, 2017

(54) VIBRATION MOTOR

(71) Applicant: Nidec Seimitsu Corporation, Ueda-shi, Nagano-ken (JP)

(72) Inventors: Tsuyoshi Yamaguchi, Ueda (JP); Takayuki Aoi, Ueda (JP); Hiroyuki Kiuchi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 520 days.

(21) Appl. No.: 14/557,610

(22) Filed: Dec. 2, 2014

(65) Prior Publication Data

US 2015/0288248 A1    Oct. 8, 2015

(30) Foreign Application Priority Data

Apr. 4, 2014   (JP) .................................. 2014-078045

(51) Int. Cl.
*H02K 7/06*        (2006.01)
*H02K 1/27*        (2006.01)

(52) U.S. Cl.
CPC ........... *H02K 7/063* (2013.01); *H02K 1/2793* (2013.01)

(58) Field of Classification Search
CPC .......... H02K 7/06; H02K 7/063; H02K 7/065; H02K 7/07; H02K 7/075; H02K 23/04; H02K 5/16; H02K 5/163; H02K 5/167; H02K 5/1675; H02K 5/1677; H02K 11/33; H02K 15/02; H02K 23/58
USPC .......................................................... 310/81
See application file for complete search history.

(56) References Cited

U.S. PATENT DOCUMENTS

| | | | |
|---|---|---|---|
| 6,836,039 B2* | 12/2004 | Kweon | H02K 5/1677 310/81 |
| 6,998,742 B2* | 2/2006 | Yamaguchi | H02K 7/063 310/156.26 |
| 7,548,002 B2* | 6/2009 | Yamaguchi | H02K 3/47 310/233 |
| 7,615,901 B2* | 11/2009 | Park | H02K 7/063 310/208 |
| 7,679,241 B2* | 3/2010 | Park | H02K 7/063 310/81 |
| 7,692,345 B2 | 4/2010 | Kayama et al. | |

(Continued)

FOREIGN PATENT DOCUMENTS

JP    2005-117849 A    4/2005
WO    2012/008248 A1    1/2012

*Primary Examiner* — Tran Nguyen
(74) *Attorney, Agent, or Firm* — Keating & Bennett, LLP

(57) ABSTRACT

A vibration motor includes an eccentric weight whose center of gravity is positioned outside a shaft and a holder made of resin and holding a ring-shaped back yoke and the eccentric weight. The back yoke includes an overhang portion which extends farther inward in a radial direction than an inner side edge of the opening of a rotor magnet. The holder includes a penetrated portion which is a tube-shaped portion positioned at an axially inner side of the rotor magnet and extends in the axial direction surrounding the shaft, an upper surface portion which expands radially outwardly from an upper side of the penetrated portion to cover an upper surface of the eccentric weight, and a lower surface portion which expands radially outwardly from the lower side of the penetrated portion to cover a lower surface of the overhang portion.

19 Claims, 13 Drawing Sheets

1A

(56) References Cited

U.S. PATENT DOCUMENTS

2004/0135444 A1\* 7/2004 Choi .................... H02K 5/1677
310/81

\* cited by examiner

VIBRATION MOTOR

BACKGROUND OF THE INVENTION

1. Field of the Invention

The present invention relates to a vibration motor and, more particularly, to a vibration motor that is preferably used for incoming call notification and the like in a mobile terminal device.

2. Description of the Related Art

Among mobile terminal devices such as mobile phones and the like, there is a function of generating vibration to notify a user of an incoming call, in addition to a function of generating a ringtone to notify the user of the incoming call. The vibration for notifying an incoming call on a mobile terminal device is generated by a vibration motor that is provided to the mobile terminal device. A structure for generating vibration by a weight that is eccentric relative to and rotates around the central axis is one of the vibration-generating structures provided in vibration motors.

A vibration motor that is proposed in Japanese Unexamined Patent Application Publication No. 2005-117849 is an example of vibration motors in which an eccentric weight rotates about the central axis to generate vibration. This vibration motor has a stator with an embedded drive circuit, and a rotor rotatably mounted thereto with a gap between the stator and rotor in an axial direction. The rotor consists of a magnetic stainless steel rotor yoke, an axial gap type magnet, and a sintered oil-less flange bearing. The axial magnetic stainless rotor yoke is disposed on the axial gap type magnet. The sintered oil-less bearing is provided to an inner diameter portion of the magnet. The rotor yoke consists of a flat portion receiving a magnetic field of the magnet, an outer diameter side skirt portion fixedly holding the arcuate eccentric weight, and an inner diameter side skirt portion rotatably supporting the axis. A tongue piece is integrally formed with and protrudes horizontally outwardly from the outer diameter skirt portion. Also, the eccentric weight is fixed to the tongue piece by soldering or adhesion. Further, the magnet is mounted by adhesion, or by spot welding and the like in case a sintered rare earth metal magnet is used.

However, in case of soldering or bonding the eccentric weight by adhesion to a member constituting the rotor such as the rotor yoke and the like, as shown in the vibration motor suggested in Japanese Unexamined Patent Application Publication No. 2005-117849, the number of processes increases in accordance with the proportion of the soldering or adhering process. Also, it is required to make a design in consideration of the tolerances accumulated when soldering or adhering the eccentric weight. Even if the design was made in consideration of the accumulated tolerances, it is difficult to make the actually assembled vibration motor as originally designed so that the desired performance may not be provided. Moreover, in case of soldering or bonding by an adhesive, the applied lead (alloy) or adhesive may be pressed out from certain places and cause some defects in manufacturing.

SUMMARY OF THE INVENTION

An exemplary preferred embodiment of the present invention provides a vibration motor including a plate-shaped base; a case including a cylindrical circumferential surface portion and a top surface portion closing an axially upper end side of the circumferential surface portion, the cylindrical circumferential surface portion being fixed to the base; a shaft with a lower end is fixed to the base and an upper end fixed to the top surface portion; a ring-shaped rotor magnet which surrounds the shaft and includes an opening at the center; an armature which is disposed on the base and faces the rotor magnet with a gap in an axial direction; a ring-shaped back yoke which is in contact with an upper surface of the rotor magnet, expanding in a radial direction, and includes an opening at the center; an eccentric weight whose center of gravity is positioned outside the shaft; and a holder which is a member made of resin and holds the ring-shaped back yoke and the eccentric weight. The back yoke includes an overhang portion which extends inwardly in the radial direction farther than an inner side edge of the opening of the rotor magnet. The holder includes a penetrated portion which is a tube-shaped region positioned at an axially inner side of the rotor magnet and extends in the axial direction surrounding the shaft, an upper surface portion which expands radially outwardly from an upper side of the penetrated portion to cover at least a portion of an upper surface of the eccentric weight, and a lower surface portion which expands radially outwardly from the lower side of the penetrated portion to cover at least a portion of a lower surface of the overhang portion. The shaft rotatably supports the holder which includes the penetrated portion.

According to an exemplary preferred embodiment of the present invention, the holder, made of resin, is configured as described above, and is thus capable of holding the back yoke and the eccentric weight. Accordingly, it is unnecessary to fix the back yoke and the eccentric weight to the rotating portion by using an adhesive or by soldering. Also, the back yoke and the eccentric weight are configured to be easily provided as a single unit. Particularly, by presetting the back yoke and the eccentric weight in a die of a molding apparatus and injecting resin into the die where the back yoke and the eccentric weight are set, the back yoke, the eccentric weight and the holder are configured to be easily provided as a single unit. As a result, the number of manufacturing processes, the tolerance accumulated in the assembling process and defects in manufacturing caused by an adhesive or lead pressed out in the process are significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
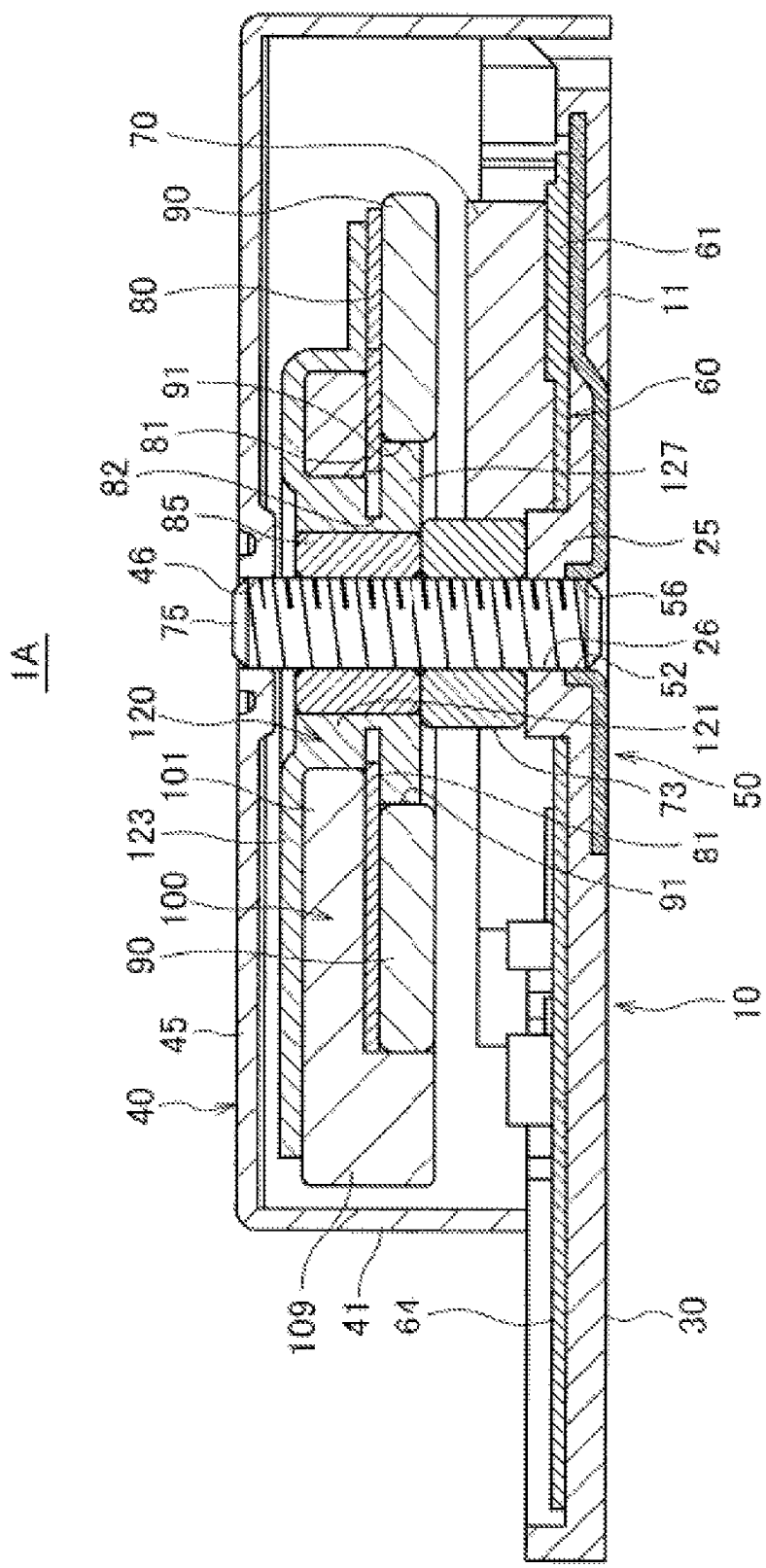
FIG. 1 is a cross-sectional view of a vibration motor according to an exemplary preferred embodiment of the present invention.

Hereinafter, exemplary preferred embodiments of the present invention will be described with reference to accompanying drawings. It will be appreciated that the technical scope of the present invention is not limited to what is particularly described and illustrated in the following description and drawings.

Firstly, a basic configuration of a vibration motor according to a preferred embodiment of the present invention will be described. Although the basic configuration will be explained with reference to FIG. 1 which illustrates a vibration motor 1A according to an exemplary preferred embodiment of the present invention, vibration motors 1B, 1C, 1D according to other preferred embodiments also have the same basic configuration.

This vibration motor 1A includes a rotating portion and a stationary portion. The rotating portion rotates relative to a shaft 75 provided at the center of the vibration motor 1A. The stationary portion generates the power to rotate the rotating portion.

The stationary portion preferably includes a plate-shaped base 10 and a case 40 including a cylindrical circumferential surface portion 41 fixed to the base 10 and a top surface portion 45 configured to close an upper end side of the circumferential surface portion 41 in an axial direction. Further, the stationary portion preferably includes a shaft 75 of which a lower end is fixed to the base 10 and an upper end is fixed to the top surface portion 45, a circuit board 60 mounted on the base 10, and an armature 70 disposed on the circuit board 60. That is, the armature is disposed on the base 10 through the circuit board 60.

The rotating portion preferably includes a rotor magnet 90, a back yoke 80, an eccentric weight 100, and a holder 120.

The rotor magnet 90 is a ring-shaped permanent magnet including an opening 91 at the center. This rotor magnet 90 faces the armature 70 with a gap therebetween in an axial direction, and rotates about the shaft 75. The back yoke 80 is preferably a ring-shaped member including an opening 82 at the center. The back yoke 80 is in contact with the upper surface of the rotor magnet 90 and expands in a radial direction. Also, the back yoke 80 includes an overhang portion 81 which extends inwardly in a radial direction farther than an inner edge of the opening 91 of the rotor magnet 90. The eccentric weight 100 has its center of gravity positioned outside the shaft 75 and rotates on the shaft 75. The holder 120 is preferably a resin member, i.e., a molded article formed of resin, and holds the back yoke 80 and the eccentric weight 100.

The holder 120 preferably includes a tube-shaped penetrated portion 121, which is positioned at an axially inner side of the rotor magnet 90, and extends in the axial direction surrounding the shaft 75. The holder 120 further includes an upper surface portion 123 which expands radially outwardly from an upper portion of the penetrated portion 121 and covers at least a portion of an upper surface of the eccentric weight 100, and a lower surface portion 127 which expands radially outwardly from a lower portion of the penetrated portion 121 and covers at least a portion of a lower surface of the overhang portion 81.

Also, the shaft 75 rotatably supports the holder 120 which includes the penetrated portion 121.

With the above-described configuration, the vibration motor 1A is capable of providing unique effects of maintaining the positions of the back yoke 80 and the eccentric weight 100 relative to the shaft 75 as originally designed, without increasing the number of manufacturing steps, and preventing manufacturing defects.

Hereinafter, respective configuration of vibration motors 1A, 1B, 1C, 1D according to exemplary preferred embodiments of the present invention will be described with reference to appropriate accompanying drawings for respective preferred embodiments of the prevent invention.

FIGS. 1 through 9 illustrate the vibration motor 1A according to an exemplary preferred embodiment of the present invention. As in the basic configuration explained above, the vibration motor 1A includes a stationary portion and a rotating portion.

As shown in FIG. 1, the stationary portion includes a base 10, a case 40, a circuit board 60, an armature 70 and a shaft 75.

As shown in FIG. 1, the base 10 defines a bottom surface of the vibration motor 1A, and preferably is formed, for example, of cast metal or molded resin. Hereinafter, the base 10 is described as a molded resin for an example.

The base 10 includes a base main body 11, and a terminal portion arranging portion 30 which protrudes outwardly from the base main body 11 in a radial direction. The base main body 11 receives the stationary portion and the rotating portion on the upper surface. Further, a terminal portion 64 of a circuit board 60 is disposed on the terminal portion arranging portion 30.

The base main body 11 preferably includes a support portion 25 at the center configured to support the shaft 75. This support portion 25 is a protruded portion at the center of the base main body 11 toward an upper side of the vibration motor 1A, and defines a cylindrical or substantially cylindrical shape, for example. The support portion 25 includes an aperture 26 at the center, into which the shaft 75 is fitted.

Further, the base main body 11 is provided with a yoke plate 50. The yoke plate 50 is a member formed of magnetic material, and induces a magnetic flux generated by a coil to the rotor magnet 90. The yoke plate 50 and the base 10 can be formed into a single integral unitary member by, for example, insert molding.

The terminal portion arranging portion 30 is a portion where the terminal portion 64 of the circuit board 60 is disposed on its upper surface, and preferably has a rectangular shape or substantially rectangular shape.

The case 40 preferably has a cylindrical or substantially cylindrical shape and preferably is made of metal or resin or the like, and includes a cylindrical or substantially cylindrical circumferential surface portion 41 and a top surface portion 45 closing an upper end side of the case 40 in an axial direction, as shown in FIG. 1. The case 40 is attached to the base 10 by fixing the circumferential surface portion 41 to the base 10.

The top surface portion 45 includes an aperture 46 at the center. This aperture 46 is a portion into which an upper end of the shaft 75 is fitted to fix the shaft 75. When the case 40 is fixed to the base 10, the aperture 46 at the center of the case 40 and the aperture 26 at the center of the base 10 are located at a same or substantially a same position in a horizontal direction.

The circuit board 60 is provided with a wiring pattern (not shown) on its upper surface, and controls driving of the vibration motor 1A. As shown in FIG. 1, this circuit board 60 includes a substrate main body 61 disposed on the base main body 11, and a terminal portion 64 protruding outwardly from the substrate main body 61. A variety of electronic components are preferably mounted on the substrate main body 61 as required.

The armature 70 is preferably a coil around which conductive wires are wound. This armature 70 is disposed on a predetermined position on the circuit board 60 that is disposed on the base 10, and interacts with a magnetic field generated by the rotor magnet 90 to produce a torque of the vibration motor 1A.

The shaft 75 extends in a vertical direction at the center of the vibration motor 1A. The lower side of the shaft 75 is received within the aperture 26 of the support portion 25 which is at the center of the base main body 11. Also, the lower side of the shaft 75 is received within the aperture 56 which is at the center of the yoke plate 50, and is supported by a shaft support portion 52. That is, the lower end of the shaft 75 is supported by the stationary portion. The upper side of the shaft 75 is fixed to the top surface portion 45 by being fitted into the aperture 46 which is at the center of the top surface portion 45 of the case 40. The lower side of the shaft 75 is supported by the support portion 25 of the base 10 and the shaft support portion 52 of the yoke plate 50. In addition, with the upper end being supported by the top surface portion 45 of the case 40, the shaft can be maintained perpendicular to the base 10. The shaft 75 is preferably also supported by a spacer 73 which is inserted at the middle of the outer circumference in a longitudinal direction. The spacer 73 is disposed on the support portion 25 which is provided at the center of the base 10. The spacer 73 will be described in detail later.

As shown in FIG. 1, the rotating portion preferably includes a rotor magnet 90, a back yoke 80, an eccentric weight 100, a holder 120, a sintered sleeve 85 and a spacer 73.

The rotor magnet 90 is preferably a ring-shaped permanent magnet including an opening 91 at the center, and is disposed with a gap between the armature 70 and the rotor magnet 90 in an axial direction which the shaft 75 extends. Also, the rotor magnet 90 places the shaft 75 at an inner side of the central opening 91, and rotates around the shaft 75.

The rotor magnet 90 interacts with the armature 70 and generates a torque at the rotating portion.

Figure 2:
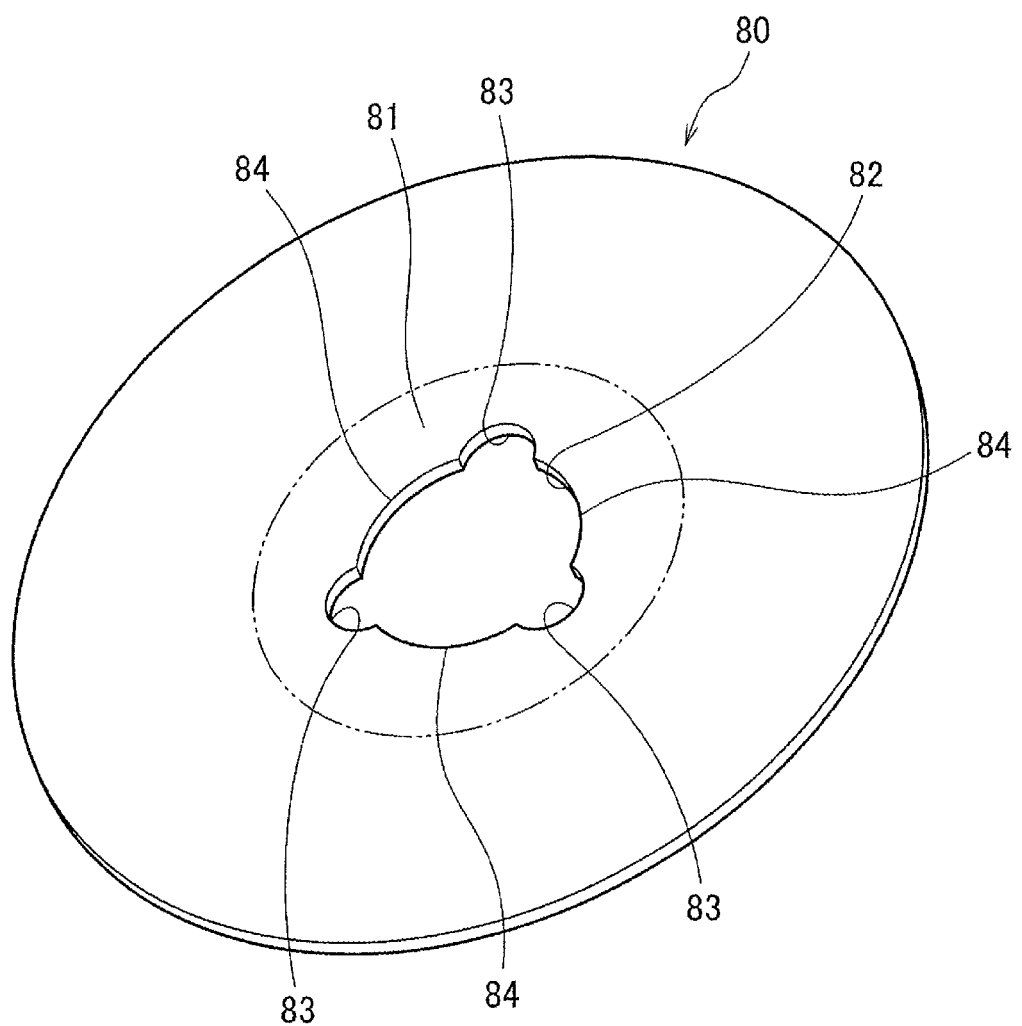
FIG. 2 is a perspective view of the back yoke according to an exemplary preferred embodiment of the present invention.

As shown in FIG. 2, the back yoke 80 is preferably a flat plate, which expands in a radial direction, includes an opening 82 at the center, and is provided in a ring-shape. The back yoke 80 includes an overhang portion 81 which extends inwardly in a radial direction farther than the inner side edge of the opening 91 of the rotor magnet 90. In FIG. 2, the portion of the back yoke 80 inward from the two-dotted phantom line is the overhang portion 81. This back yoke 80 is disposed in contact with the upper surface of the rotor magnet 90, and defines and functions as a metal core defining a portion of a magnetic circuit also including the yoke plate 50 and the rotor magnet 90. This back yoke 80 is preferably made of, for example, alloys of iron or steel or the like. Alloys of steel and the like may be, for example, stainless steel, cold rolled steel plate, cold rolled steel strip, electro-galvanized steel plate and electro-galvanized steel strip.

The inner edge of the back yoke 80, that is, the circumferential edge of the opening 82 defined at the center, includes first concave portions 83 located at a farther radial distance from the center axis of the shaft 75 than the adjacent regions 84 on the left and right sides in a circumferential direction. Accordingly, an outer circumference of the penetrated portion 121 of the holder 120 will become partially in contact with an inner side of the first concave portions 83, which will be explained in detail later. In the example shown in FIG. 2, the inner edge of the back yoke 80 is preferably provided with first concave portions 83 recessed outwardly in the radial direction of the back yoke 80 at three positions in the circumferential direction. However, the first concave portions 83 may alternatively be provided on at least one position in the circumferential direction, or may be provided at one or two positions, and even at four positions or more in the circumferential direction.

Further, although the back yoke 80 shown in FIG. 2 includes a first concave portion 83 in the opening 82 provided at the center, such a configuration in which a groove is provided by denting the back yoke 80 in its thickness direction at an radially outer side from the opening 82 of the back yoke 80, and filling the resin forming the holder 120 in the groove may be used, which is not specifically illustrated in the drawings. Moreover, an aperture penetrating the back yoke 80 in the thickness direction may be provided at a radially outer side from the opening 82 of the back yoke 80 and the resin, which defines the holder 120, may be passed through the hole.

According to the above-described configuration, since the back yoke 80 preferably is a flat plate, it is possible to manufacture the back yoke simply by performing, for example, a punching process on a steel plate. Thus, it is also possible to form a molding die for manufacturing the back yoke at a low cost, and to shorten the manufacturing time, and reduce the manufacturing cost.

Figure 3:
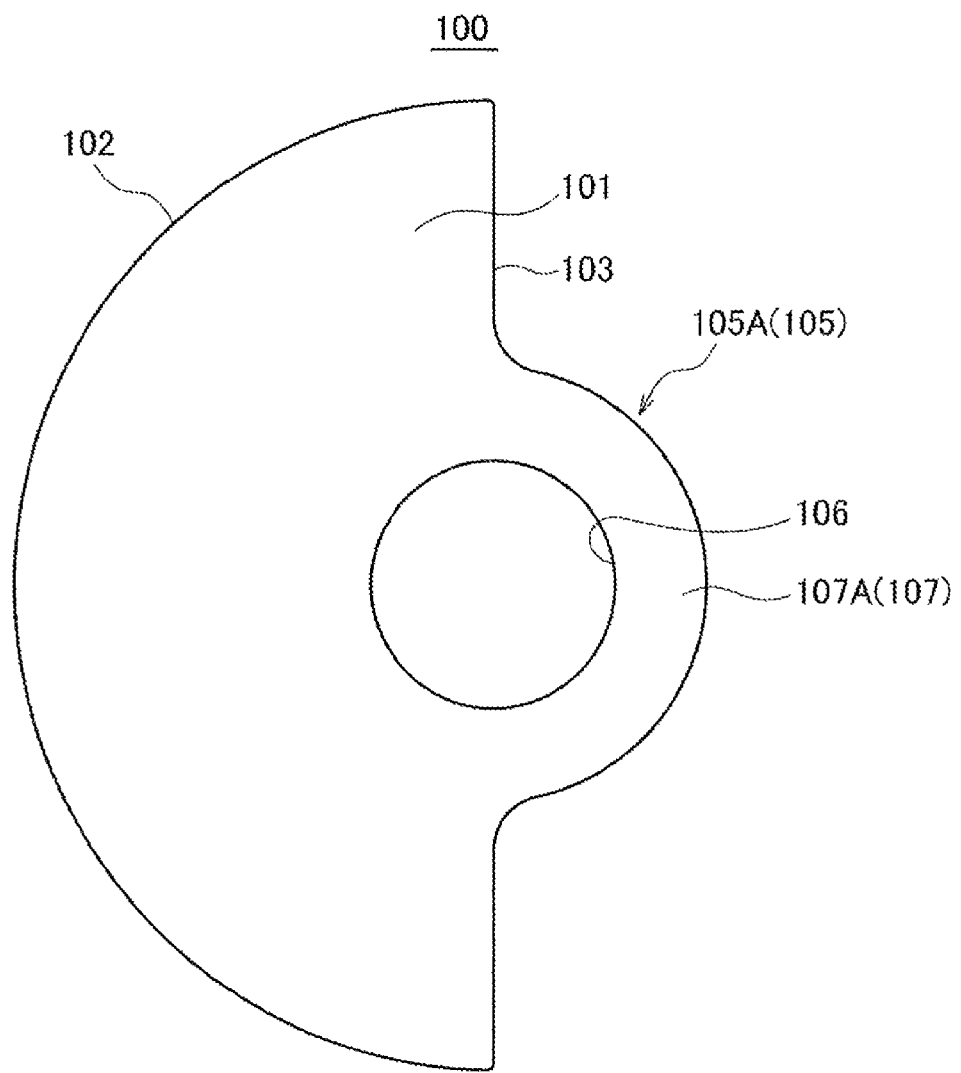
FIG. 3 is a plane view of the eccentric weight including a first type support opening according to an exemplary preferred embodiment of the present invention.

The eccentric weight 100 has a center of gravity positioned outside the shaft 75, and generates vibration by rotating about the shaft 75. As shown in FIGS. 1 and 3, the eccentric weight 100 preferably includes a horizontal portion 101 having a semicircular or substantially semicircular shape. An outer circumferential edge of the horizontal portion 101 includes a circumferential edge portion 102 having an arcuate shape which is outwardly oriented in the radial direction, and a linear portion 103 which is directed to the shaft 75 positioned at the center. This eccentric weight 100 overlaps with the back yoke 80, with the back yoke 80 disposed at the lower side of the eccentric weight 100.

The eccentric weight 100 preferably includes a support opening 105. The support opening 105 is provided at a center portion of the linear portion 103 of the horizontal portion 101. The support opening 105 includes an arcuate portion 106 which is provided at the center of the linear portion 103 directed to the shaft 75, and a frame 107 which protrudes outwardly from the linear portion 103. The support opening 105 surrounds the shaft 75 with a central angle in a range greater than 180°. There are two types of the support opening 105, one as shown in FIG. 3, and the other as shown in FIG. 4.

As shown in FIG. 3, the first type of support opening 105A surrounds the entire periphery around the shaft 75 with the arcuate portion 106 provided at the center of the linear portion 103 and the frame 107A. The arcuate portion 106 is a portion where the center of the linear portion 103 is dented into an arcuate shape at the circumferential edge portion 102 of the horizontal portion 101. The frame 107A defines an arcuate shape, and protrudes radially outwardly from the linear portion 103 at a side opposite to the side at which the horizontal portion 101 is provided. The first type of support opening 105A surrounds the entire periphery around the shaft 75 with the arcuate portion 106 and the frame 107A.

Figure 4:
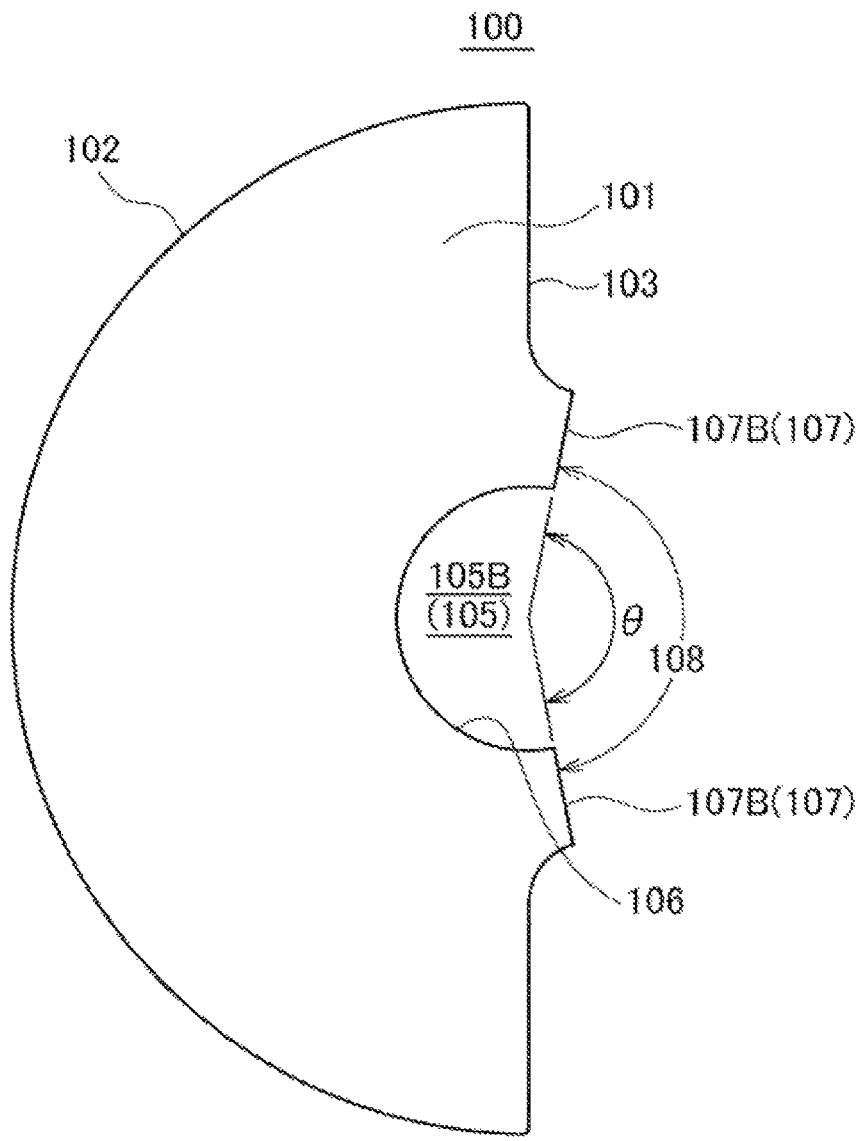
FIG. 4 is a plane view of the eccentric weight including a second type support opening according to an exemplary preferred embodiment of the present invention.

As shown in FIG. 4, the second type of support opening 105B surrounds the shaft 75 with the arcuate portion 106 having an arcuate shape provided at the center of the linear portion 103 and a frame 107B, with a central angle in a range greater than 180°. The arcuate portion 106 is a portion where the center of the linear portion 103 of the horizontal portion 101 is dented into an arcuate shape. Also, the frame 107B protrudes radially outwardly from the linear portion 103 at a side opposite to the side at which the horizontal portion 101 is provided. Frame 107B preferably includes an open portion 108 which is opened with a central angle θ in a range smaller than 180°.

In addition, the eccentric weight 100 is provided at a position where an arcuate circumferential edge portion 102 defining the horizontal portion 101 is positioned, and includes a peripheral wall 109 which covers the outer circumference of the rotor magnet 90. This peripheral wall 109 may be provided at a portion in the circumferential direction where the arcuate-shaped circumferential edge portion 102 is positioned, or may be provided in the entire area of the circumferential edge portion 102. This peripheral wall 109 increases the volume of the eccentric weight 100, compared to an eccentric weight without a peripheral wall. For this reason, the peripheral wall 109 increases the inertial force of the eccentric weight 100, and improves the performance of the vibration motor 1A. However, the peripheral wall 109 may be provided as desired, and it does not need to be provided depending on the specification required for the vibration motor 1A.

Although it was mentioned that there are two types of support opening 105 of the eccentric weight 100, which are 105A of FIGS. 3 and 105B of FIG. 4, however, the shape of the support opening 105 is not limited to these two types, and various shapes that are not limited to an arcuate shape may be used as well. Further, as to the exterior shape of the eccentric weight 100, a variety of shapes may be used in the extent that they do not adversely affect the functional effects of the present invention. These features are not limited only to the eccentric weight 100 used in the vibration motor according to the exemplary preferred embodiment of the present invention, but are also applied to other eccentric weights which may be used in vibration motors of other preferred embodiments.

Figure 5:
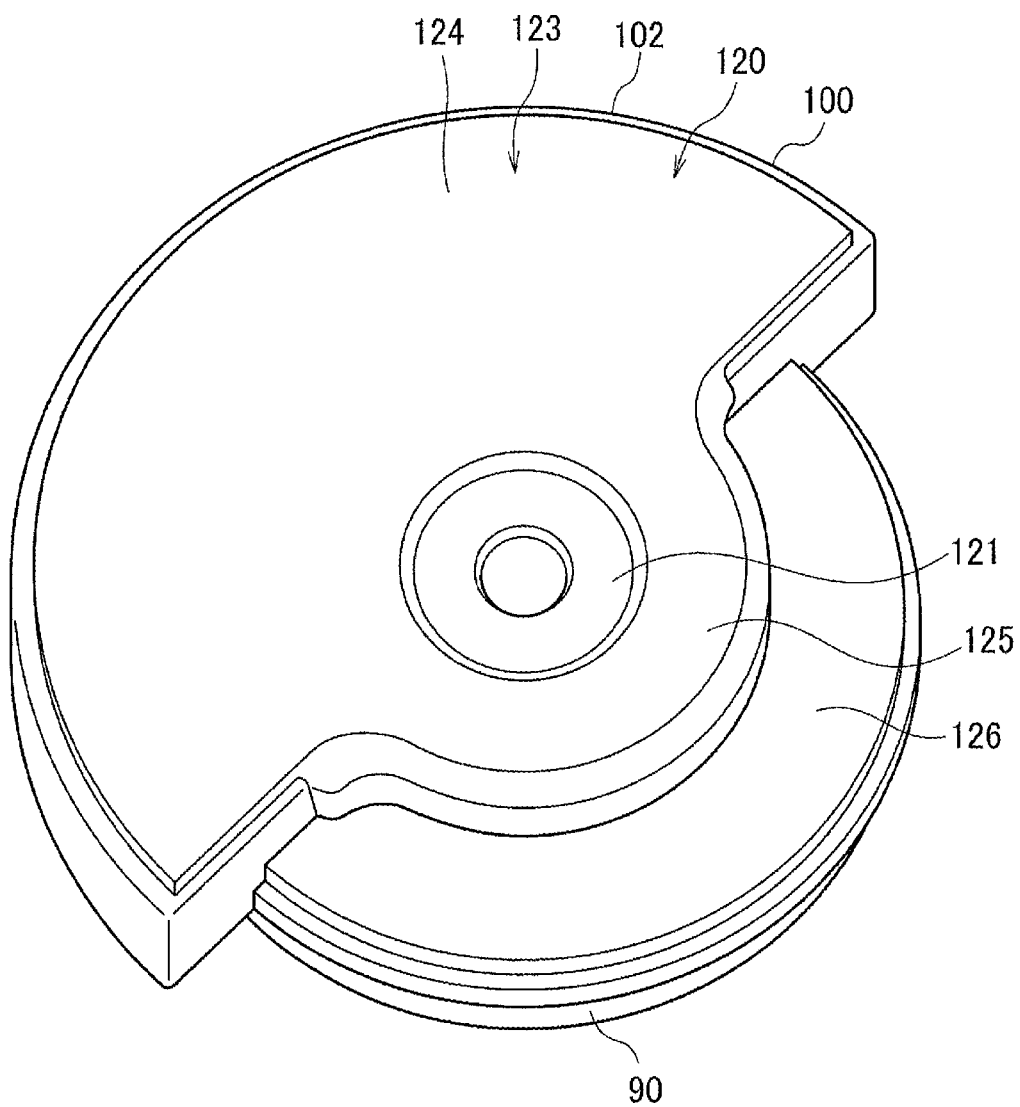
FIG. 5 is a perspective view of the rotor magnet, the back yoke, the eccentric weight, and the holder provided as a single unit according to an exemplary preferred embodiment of the present invention, in which the back yoke and the eccentric weight is held by the holder and the rotor magnet is indirectly held through the back yoke to the holder.

The holder 120 supports the back yoke 80 and the eccentric weight 100, and the rotor magnet 90, the back yoke 80, the eccentric weight 100 and the holder 120 are configured into a single unit. As shown in FIGS. 1 and 5, the holder 120 includes a penetrated portion 121, an upper surface portion 123, and a lower surface portion 127.

The penetrated portion 121 is a cylindrical portion which is positioned at a radially inner side of rotor magnet 90, surrounds the periphery of the shaft 75, and extends in an axial direction. This penetrated portion 121 rotatably supports the holder 120 with respect to the shaft 75. Further, the penetrated portion 121 is provided at the radially inner side of the support opening 105 of the eccentric weight 100, and at the radially inner side of the opening 82 provided at the center of the back yoke 80.

Figure 6:
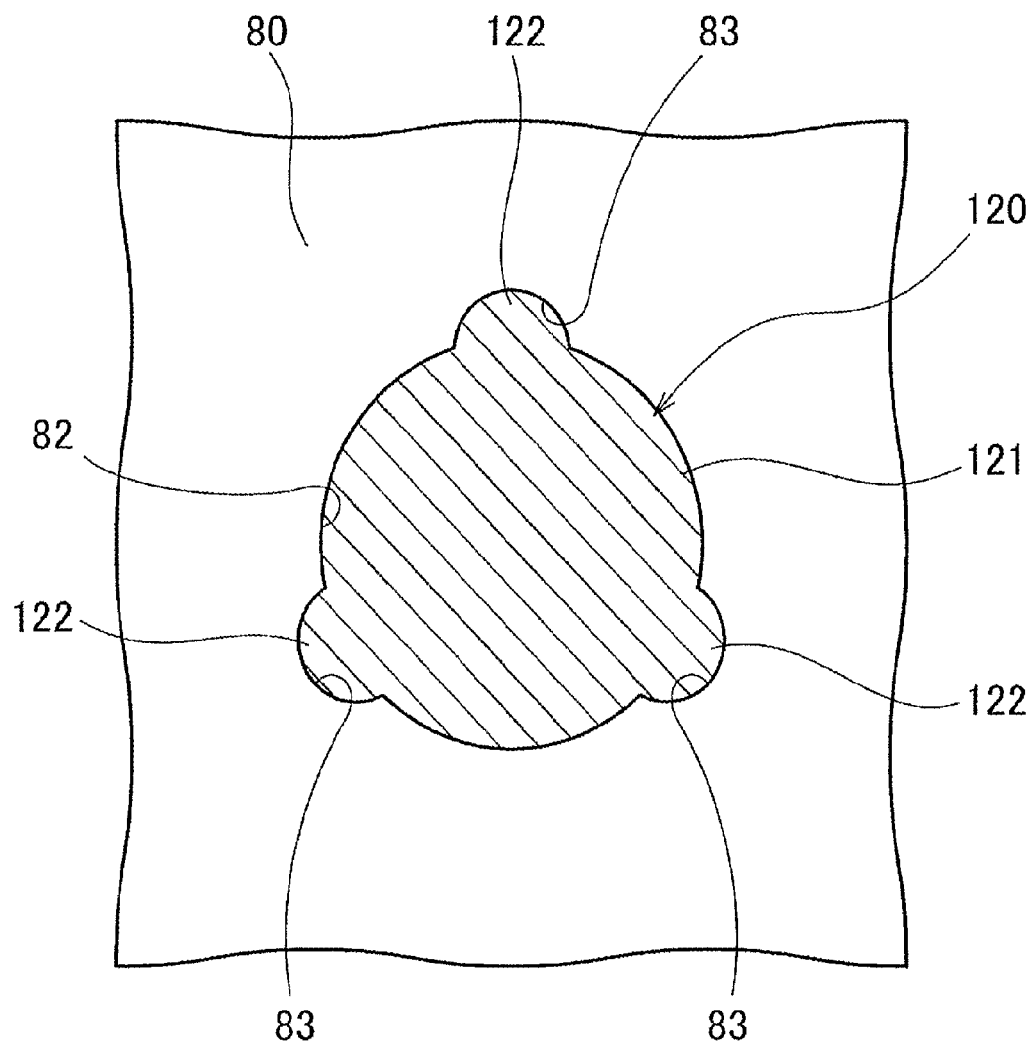
FIG. 6 is a drawing illustrating the penetrated portion of the holder which is partially in contact with a first concave portion of the back yoke according to an exemplary preferred embodiment of the present invention.

The outer circumference of the penetrated portion 121 includes a portion which is in contact with the inner side of the first concave portion 83 of the opening 82 provided at the center of the back yoke 80. In particular, as shown in FIG. 6, the outer circumference of the penetrated portion 121 preferably includes a first convex portion 122 which protrudes outwardly in a radial direction. The first convex portion 122 contacts the inner side of the first concave portion 83 of the opening 82 provided at the center of the back yoke 80, and fixes the back yoke 80 to the penetrated portion 121 of the holder 120. With this, it is possible to prevent the back yoke 80 from rotating relative to the holder 120.

The upper surface portion 123 expands outwardly from the upper portion of the penetrated portion 121 in a radial direction, and covers at least a portion of the upper surface of the eccentric weight 100. In an example of the holder 120 shown in FIG. 5, the upper surface portion 123 is preferably defined in a fan shape, and includes an eccentric weight corresponding portion 124 which covers most of the upper surface of the horizontal portion 101 of the eccentric weight 100, a back yoke corresponding portion 126 which covers most of the upper surface of the back yoke 80, and a frame corresponding portion 125 which entirely covers the frame 107 which defines the support opening 105 of the eccentric weight 100.

The radius of the eccentric weight corresponding portion 124 which covers most of the uppers surface of the eccentric weight 100 is smaller than the radius of the horizontal portion 101 of the eccentric weight 100, and the outer circumferential edge of the eccentric weight corresponding portion 124 is positioned at an inner side of the circumferential edge portion 102 of the horizontal portion 101. The back yoke corresponding portion 126 preferably has a semicircular or substantially semicircular shape which is smaller than the radius of the eccentric weight corresponding portion 124, and expands in a direction opposite to the direction in which the eccentric weight corresponding portion 124 expands in a radial direction. The radius of the back yoke corresponding portion 126 is smaller than the radius of the back yoke 80, and the outer circumferential edge of the back yoke corresponding portion 126 is positioned at an inner side of the outer circumferential edge of the back yoke 80. The frame corresponding portion 125 preferably has a semicircular or substantially semicircular shape, and expands in a direction opposite to the direction in which the eccentric weight corresponding portion 124 expands in a radial direction. This frame corresponding portion 125 defines a step with respect to the upper surface portion 123 at the outer circumferential edge of the frame corresponding portion 125.

The lower surface portion 127 expands radially outwardly from the lower portion of the penetrated portion 121 within the opening 91 which defines the inner circumferential edge of the rotor magnet 90, and covers at least a portion of the lower surface of the back yoke 80. As shown in FIGS. 1 and 2, the back yoke 80 includes an overhang portion 81 which protrudes toward the central side in a radial direction farther than the inner circumferential edge of the rotor magnet 90. The lower surface portion 127 preferably covers at least a portion of the overhang portion 81 of the back yoke 80. The rotor magnet 90 is fixed to the back yoke 80 preferably by adhesion or welding, for example.

Figure 7:
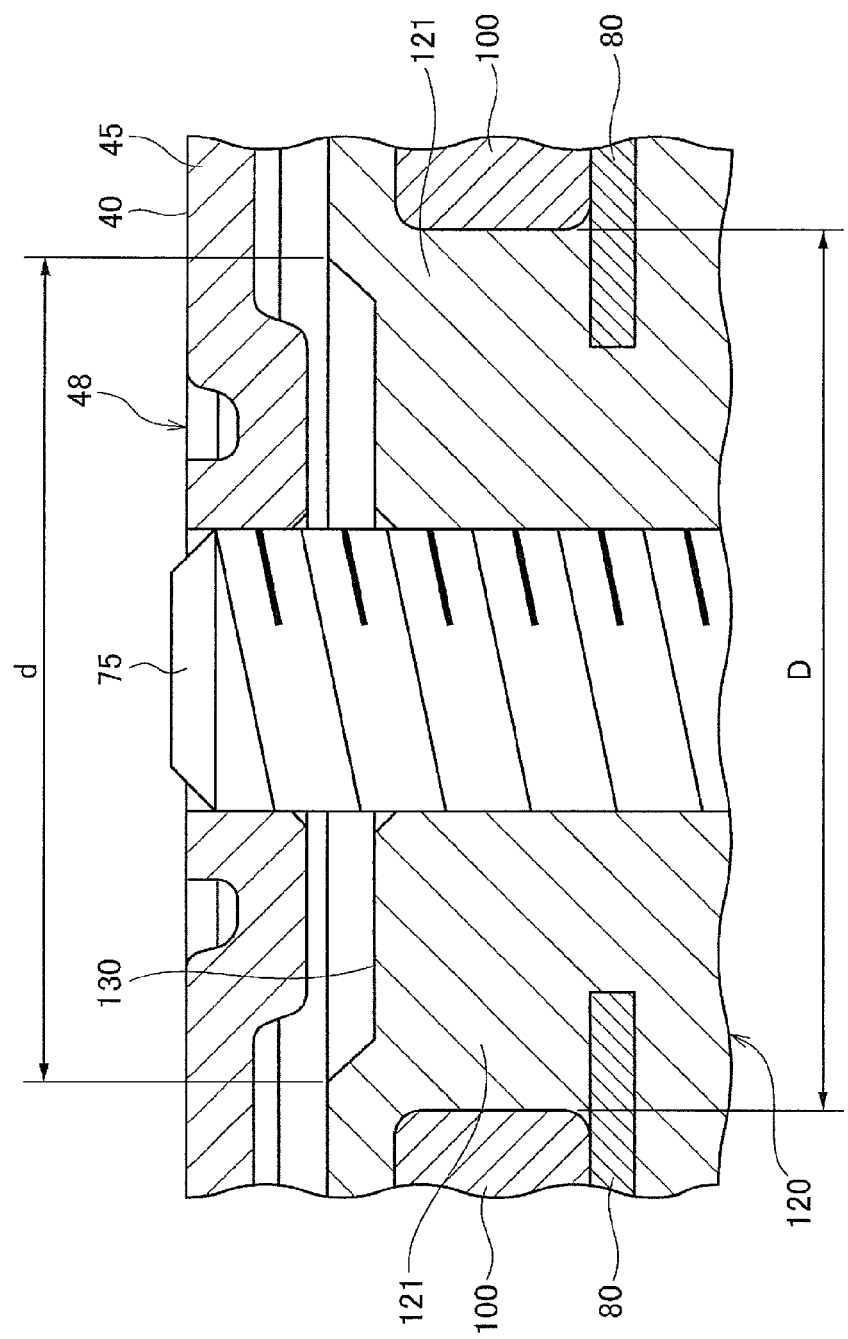
FIG. 7 is a magnified view of the upper portion of the holder according to an exemplary preferred embodiment of the present invention illustrating a recess provided thereto.

Furthermore, as shown in FIG. 7, the upper portion of the holder 120 is provided with a recess 130 which is preferably formed by denting a central side. When the top surface portion of the case 40 is processed and a bar ring portion 48 is provided in order to fix the shaft 75, the recess 130 prevents the bar ring portion 48 from contacting the holder 120. With these features, it is unnecessary to increase the height of the top of the case 40 enough to define a gap between the top surface portion 45 and the holder 120 in response to the recessed length of the bar ring portion 48 inwardly from the case 40, thus making it possible to reduce the thickness of the vibration motor 1A.

In case the recess 130 is provided at the upper portion of the holder, it is preferable to reduce an inner diameter d of the recess 130 so that it becomes smaller than an outer diameter D of the penetrated portion 121 at the upper portion of the holder 120. The bigger the inner diameter of the recess 130 becomes, the thinner the thickness of the resin of the upper surface portion 123 becomes at the position of the recess 130, and it becomes difficult to fix the eccentric weight 100 firmly. However, by making the inner diameter d of the recess 130 smaller than the outer diameter D of the penetrated portion 121 at the upper portion of the holder 120, it is possible to ensure the thickness of the upper surface portion 123. For this reason, it is possible to strongly fix the eccentric weight 100.

Figure 8:
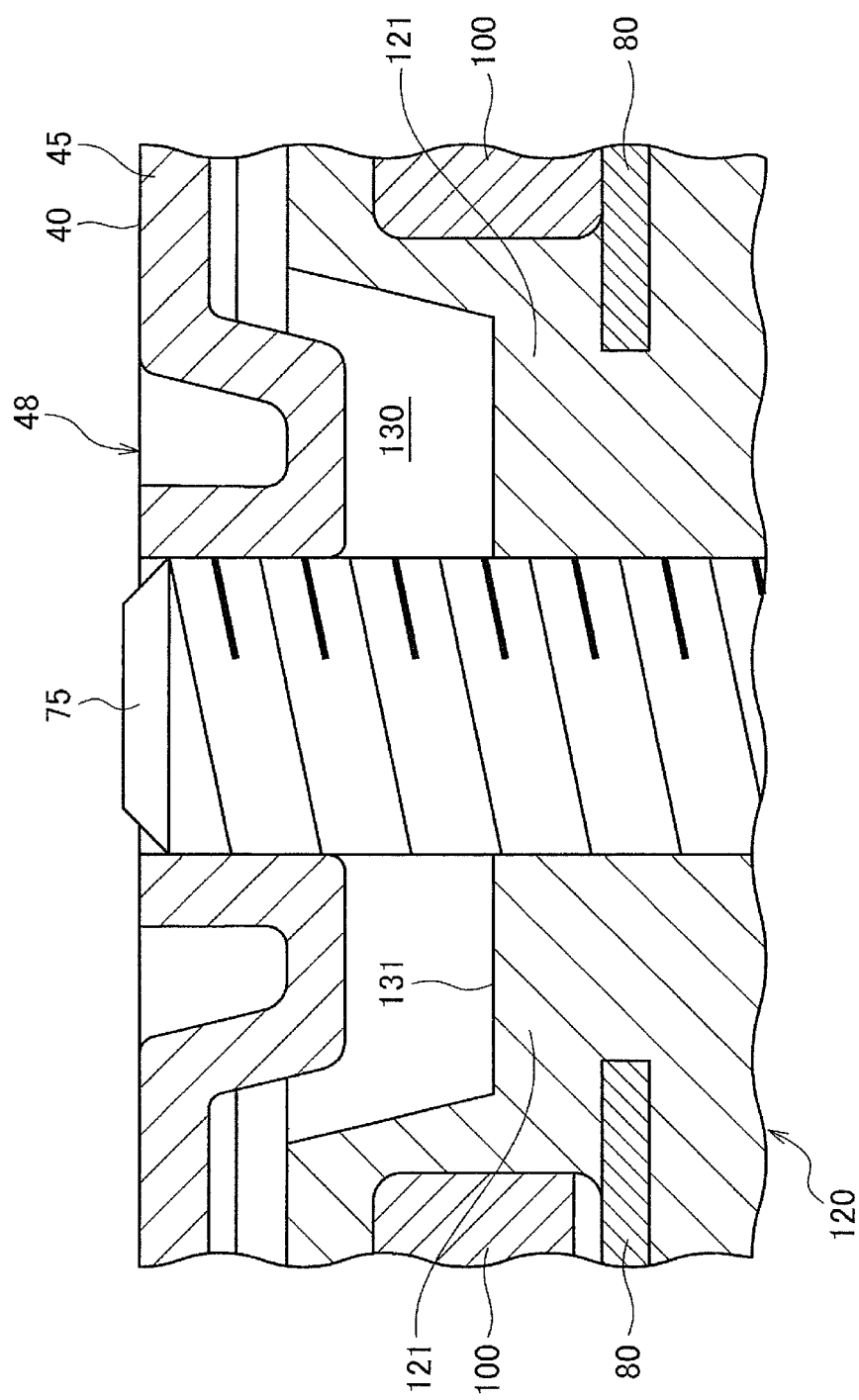
FIG. 8 is a magnified view of the upper portion of the holder according to an exemplary preferred embodiment of the present invention illustrating a recess which has a shape different from the recess illustrated in FIG. 7.

Also, in case the recess 130 is provided at the upper portion of the holder 120, as shown in FIG. 8, it is possible to place a bottom portion 131 of the recess 130 at a lower side than the upper portion of the eccentric weight 100. When the bottom of the recess 130 is positioned at a side axially lower than the upper portion of the eccentric weight 100, it is possible to dent the center of the top surface portion 45 of the case 40 relatively more deeper, and thus relatively lengthen the length of the bar ring part 48. With these features, it is not only possible to decrease the thickness of the entire vibration motor 1A, but to also lengthen the portion which supports the shaft 75 at the top surface portion 45 of the case 40 in an axial direction of the shaft 75.

By including a penetrated portion 121, an upper surface portion 123, and a lower surface portion 127, the holder 120 supports the back yoke 80 and the eccentric weight 100, and the rotor magnet 90, the back yoke 80, the eccentric weight 100 and the holder 120 are configured as a single unit.

An exemplary method of configuring the rotor magnet 90, the back yoke 80, the eccentric weight 100 and the holder 120 is described below.

The holder 120 is preferably a molded article formed by injecting resin into a shaping frame of a molding apparatus (not illustrated). When the holder 120 is molded, the back yoke 80 and the eccentric weight 100 are preset in the shaping frame of the molding apparatus. When the back yoke 80 and the eccentric weight 100 are preset inside the shaping frame, the position of the opening 82 of the back yoke 80 and the position of the support opening 105 of the eccentric weight 100 are aligned. Also, the back yoke 80 and the eccentric weight 100 are fixed inside the shaping frame, and each member is prevented from being dislocated. The resin is injected into the shaping frame where the back yoke 80 and the eccentric weight 100 are set, and molds the penetrated portion 121, the upper surface portion 123 and the lower surface portion 127. When the resin is injected inside the shaping frame, and the penetrated portion 121, the upper surface portion 123, and the lower surface portion 127 are molded, the outer circumference of the region shaped into the penetrated portion 121 becomes partially in contact with the inner side of the first concave portion 83 of the opening 82 provided at the center of the back yoke 80.

When the resin injected into the shaping frame of the molding apparatus is hardened, the upper surface portion 123 and the lower surface portion 127 of the holder 120 encapsulate the eccentric weight 100 and the back yoke 80 from both upper and lower direction. For this reason, the eccentric weight 100 is supported by the holder 120 while the support opening 105 surrounds the penetrated portion 121 of the holder 120. Also, the back yoke 80 is supported by the holder 120 while the outer circumference of the penetrated portion 121 is partially in contact with the inner side of the first concave portion 83. Then, the rotor magnet 90 is fixed to the back yoke 80 preferably by, for example, adhesion or welding while the upper surface of the rotor magnet 90 is in contact with the back yoke 80, so that it is indirectly supported by the holder 120 through the back yoke 80. As a result, the back yoke 80 and the eccentric weight 100 are supported by the holder 120, and thereby the rotor magnet 90, the back yoke 80, the eccentric weight 100 and the holder 120 are preferably configured into a single unit.

The region where the outer circumference of the penetrated portion 121 is partially in contact with the inner side of the first concave portion 83 is the first convex portion 122 (see FIG. 6). The portion in contact with the first concave portion 83 defines and functions as a connection which integrally rotates the back yoke 80 and the holder 120. For this reason, the back yoke 80 is reliably prevented from being separated from the holder 120 and rotating around the shaft 75.

The above-described holder 120 supports the back yoke 80 and the eccentric weight 100. With such a construction, it is unnecessary to attach the back yoke 80 and the eccentric weight 100 to the rotating portion with an adhesive, or to fix them to the rotating portion by soldering, and it is accurately fix the rotor magnet 90, the back yoke 80, and the eccentric weight 100 to the designed position. As a result, an attempt can be made to reduce the number of manufacturing steps, and to reduce the manufacturing defect caused by the tolerance accumulated in the assembling process and by the pressed out adhesive or lead.

Set forth below is an explanation of how the back yoke provided to vibration motor 1A of the present preferred embodiment can be formed into a plate shape.

In a conventional vibration motor of which the back yoke is disposed to be in contact with the upper surface of the rotor magnet, it was necessary to provide thereto a constitution to prevent the rotor magnet from being dislocated by centrifugal force. Specifically, a skirt portion was provided to the back yoke to extend from the back yoke to the lower side, that is, toward the rotor magnet, and this skirt portion prevented the dislocation of the rotor magnet.

On the contrary, the holder 120 provided to vibration motor 1A according to a preferred embodiment of the present invention configures the rotor magnet 90, the back yoke 80 and the eccentric weight 100 into a single unit. Since the holder is disposed inside the opening 91 of the rotor magnet 90, it is unnecessary to provide a skirt portion to the back yoke as in the conventional vibration motor, and therefore a plate-shaped back yoke 80 is capable of being used.

Figure 9:
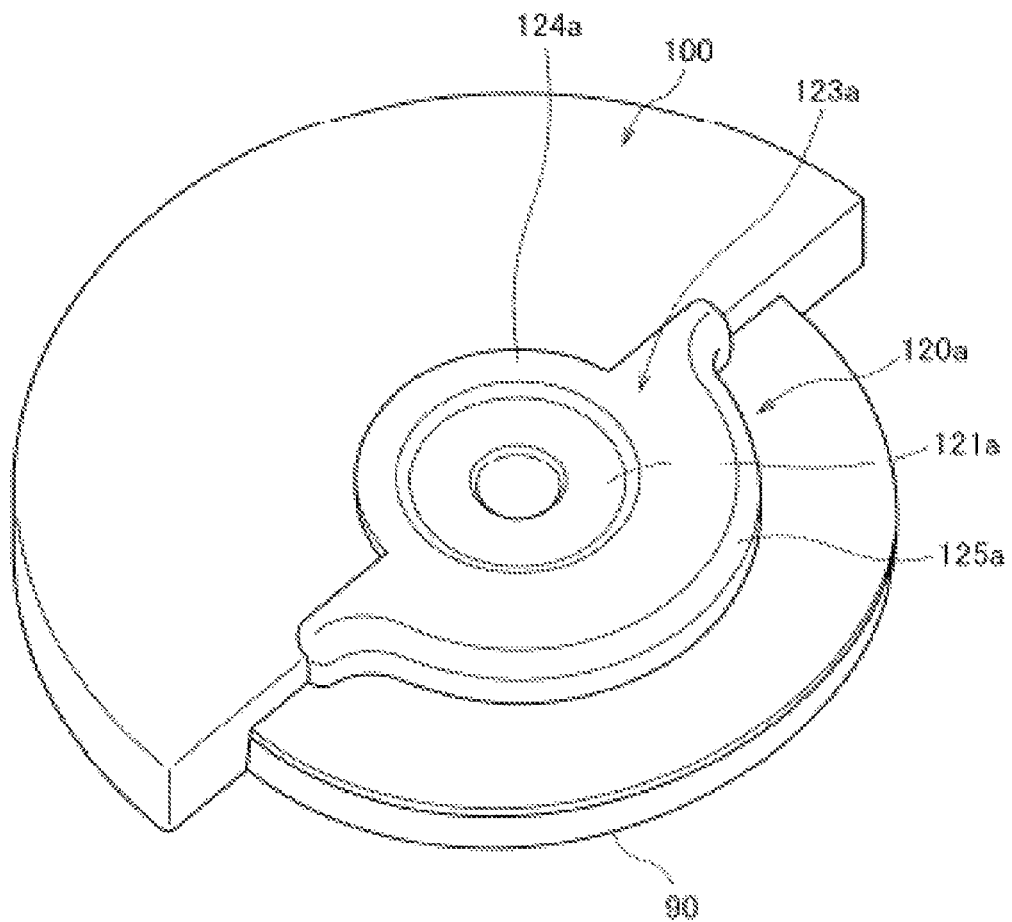
FIG. 9 a perspective view of the rotor magnet, the back yoke, the eccentric weight, and the holder provided as a single unit according to an exemplary preferred embodiment of the present invention, in which the back yoke and the eccentric weight is held by a holder that is different from the holder illustrated in FIG. 5, and the rotor magnet is indirectly held through the back yoke to the holder.

The holder can also be configured as shown in FIG. 9. The basic configuration of the holder 120a shown in FIG. 9 is preferably identical to that of the holder 120 shown in FIGS. 1 and 5, it is positioned at an inner side of the rotor magnet 90 in a radial direction, and includes a tube-shaped penetrated portion 121a which surrounds the shaft 75 and extends in an axial direction, and an upper surface portion 123a which expands outwardly from the upper portion of the penetrated portion 121a in a radial direction, and convers at least a portion of the upper surface of the eccentric weight 100. Although it is not shown in FIG. 9, a lower surface is also provided, which extends outwardly from the lower portion of the penetrated portion 121a in a radial direction, and convers at least a portion of the lower surface of the overhang portion 81. The construction and effect of the penetrated portion 121a and the lower surface of the holder 120a shown in FIG. 9 are preferably identical to those of the penetrated portion 121 and the lower surface portion 127 of the holder 120 shown in FIGS. 1 and 5. Meanwhile, an upper surface portion 123a of the holder 120a shown in FIG. 9 is preferably different from the constitution of the upper surface portion 123 of the holder 120 shown in FIGS. 1 and 5.

The upper surface portion 123a of the holder 120a is defined by a semicircular-shaped or substantially semicircular-shaped eccentric weight corresponding portion 124a which partially covers the center of the eccentric weight 100, and a frame corresponding portion 125a which covers the frame 107 which defines the support opening 105 of the eccentric weight 100. The radius of the eccentric weight corresponding portion 124a with respect to the upper surface portion 123a is preferably smaller than the radius of the frame corresponding portion 125a.

The sintering sleeve 85 defines and functions as a bearing which rotatably supports the above-described holder 120 with respect to the shaft 75. This sintering sleeve 85 preferably has a cylindrical or substantially cylindrical shape, and includes an aperture at the center where the shaft 75 passes through. The sintering sleeve 85 preferably includes an aperture at the center which the shaft 75 passes through, and is disposed in between the holder 120 and the shaft 75. The sintering sleeve 85 prevents the inner circumference of the holder 120 from wearing out by abrasion, and thus prolongs the life of vibration motor 1A.

The spacer 73 preferably has a cylindrical or substantially cylindrical shape, and includes an aperture at the center where the shaft 75 passes through. This spacer 73 is disposed in between the base 10 and the holder 120 with respect to an axial direction extended from the shaft 75, and preforms positioning for the rotor magnet 90, the back yoke 80, the eccentric weight 100 and the holder 120 in an axial direction. The spacer 73 preferably includes an aperture at the center where the shaft 75 passes through, and is mounted on a support portion 25 which is provided at the center of the base 10. Also, the spacer 73 supports the lower surface of the holder 120 and the lower surface of the sintering sleeve 85 from the bottom at the upper surface.

Figure 10:
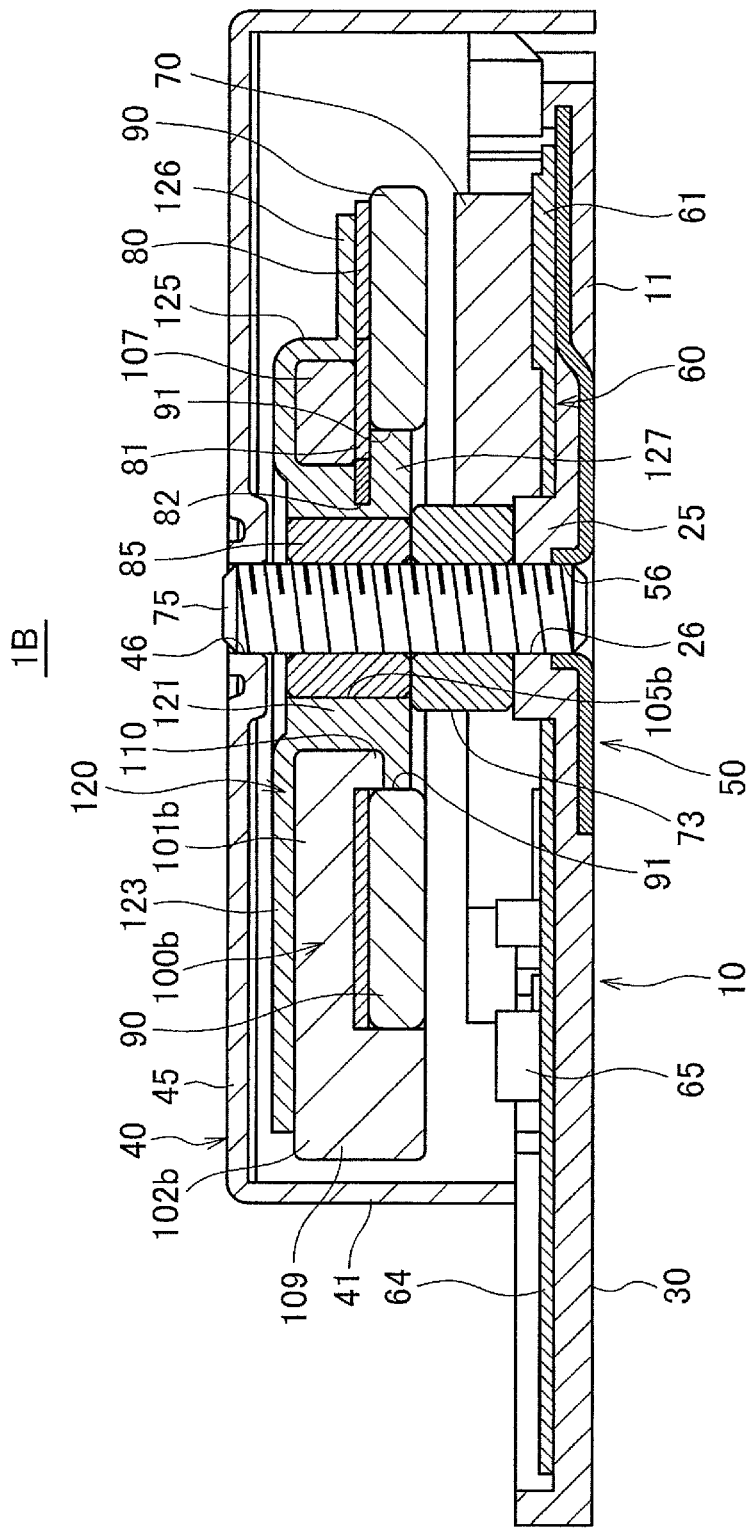
FIG. 10 is a sectional view of a vibration motor according to another preferred embodiment of the present invention.

Next, set forth below is an explanation of vibration motor 1B which relates to another preferred embodiment of the present invention with reference to FIG. 10. Vibration motor 1B, which relates to another preferred embodiment, has a different configuration of an eccentric weight 100b from the eccentric weight 100 of vibration motor 1A which relates to an exemplary preferred embodiment of the present invention, however, apart the eccentric weight 100b, preferably all other elements are the same. For this reason, apart the eccentric weight 100b, the elements of vibration motor 1B which relates to another preferred embodiment shown in FIG. 10 are designated with symbols identical to each element of vibration motor 1A which relates to an exemplary preferred embodiment of the present invention, and each of those identical elements will not be discussed in detail. Set forth below is a detailed description of the construction of the eccentric weight 100b.

The basic configuration of vibration motor 1B which relates to another preferred embodiment is preferably identical to that of vibration motor 1A which relates to an exemplary preferred embodiment of the present invention, and is defined by a rotating portion which rotates with respect to the shaft 75 provided at the center of vibration motor 1B, and a stationary portion which generates the power to rotate the rotating portion.

The stationary portion includes a base 10, a case 40, a circuit board 60, an armature 70, and a shaft 75. Meanwhile, the rotating portion preferably includes a rotor magnet 90, a back yoke 80, an eccentric weight 100b, and a holder 120. The rotating portion also includes a sintering sleeve 85, which is a bearing, and a spacer 73.

Like the eccentric weight 100 shown in FIGS. 1 and 3, the eccentric weight 100b also includes a semicircular-shaped or substantially semicircular-shaped horizontal portion 101b. The circumferential edge of the horizontal portion 101b is defined by an arcuate-shaped circumferential edge 102b which is directed outwardly in a radial direction, and a lineal portion which is directed to the shaft 75 positioned at the center. Also, the eccentric weight 100b preferably includes a support opening 105b. Like the eccentric weight 100 provided to vibration motor 1A which relates to an exemplary preferred embodiment of the present invention, there also two types of this support opening 105b, which are 105A as shown in FIG. 3, and 105B as shown in FIG. 4.

Also, the eccentric weight 100b is disposed where the arcuate-shaped circumferential edge 102b, which defines the horizontal portion 101b, is positioned, and is preferably provided with a peripheral wall 109 which covers the outer circumference of the rotor magnet 90. However, the peripheral wall 109 can be provided as necessary, and it does not need to be provided depending on the specification required for vibration motor 1B.

The eccentric weight 100b also preferably includes an inner wall 110 which covers the inner side edge of the back yoke 80. This inner wall 110 is configured preferably by protruding the lower surface of the horizontal portion 101b of the eccentric weight 100b from a more central side than the back yoke 80 in a radial direction to a lower side than the lower surface of the back yoke 80. The inner wall 110 can be disposed at the entire area where the eccentric weight 100b and the back yoke 80 overlap with respect to the inner circumferential edge of the back yoke 80 in a circumferential direction, and can be disposed partially in the overlapping area of the eccentric weight 100b and the back yoke 80.

As to vibration motor 1B which relates to another preferred embodiment of the present invention, since the eccentric weight 100b covers the inner circumferential edge of the back yoke 80, it is capable of preventing the eccentric weight 100b from being dislocated from the holder 120 when the centrifugal force generated by the rotation is applied to the eccentric weight 100b.

Figure 11:
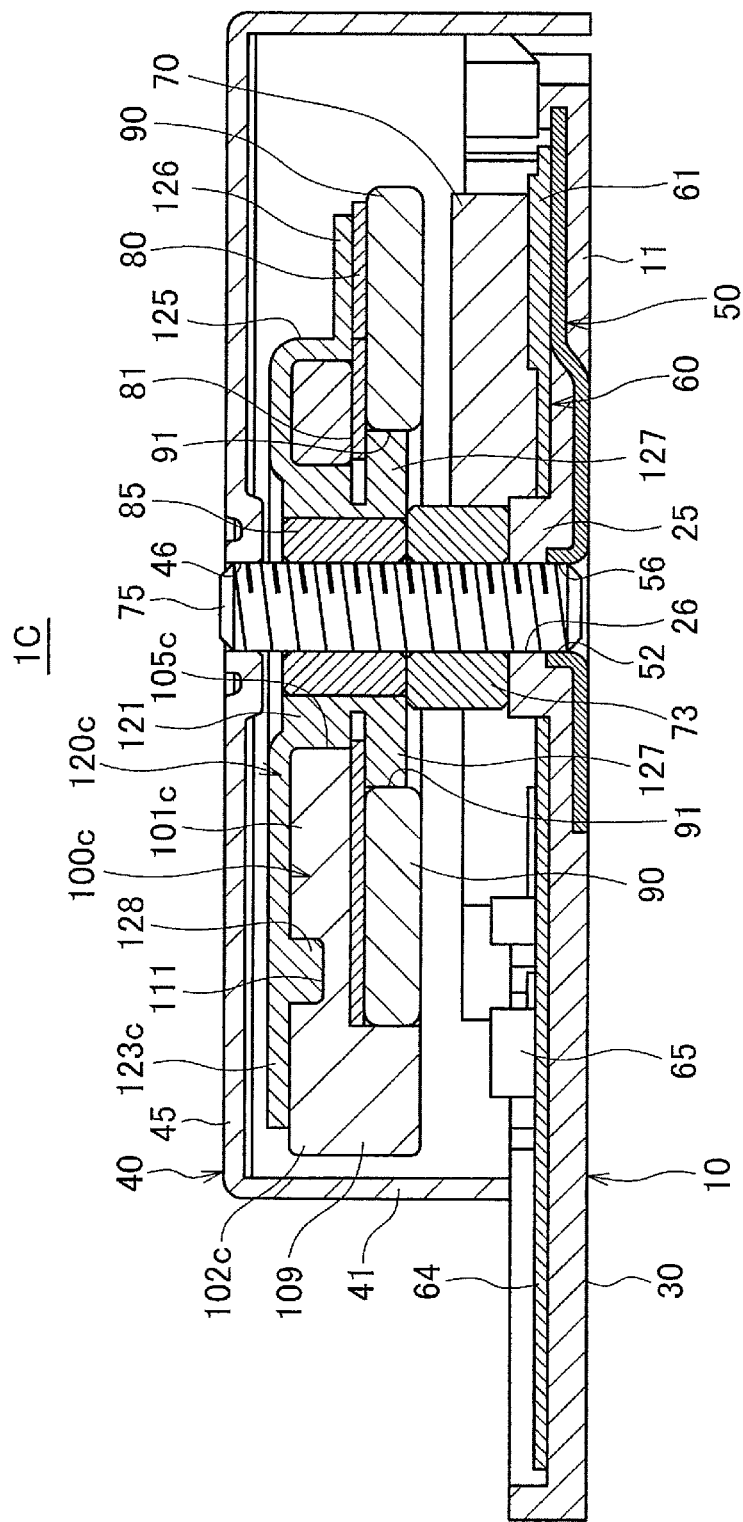
FIG. 11 is a sectional view of a vibration motor according to another preferred embodiment of the present invention.

Next, set forth below is an explanation of vibration motor 1C which relates to another preferred embodiment with reference to FIG. 11. As to this vibration motor 1C which relates to another preferred embodiment, the elements of an eccentric weight 100c and a holder 120c are different from those of vibration motor 1A which relates to an exemplary preferred embodiment of the present invention; however, apart from the eccentric weight 100c and the holder 120c, other elements are preferably identical. For this reason, in FIG. 11, apart from the eccentric weight 100c and the holder 120c, symbols from vibration motor 1A of an exemplary preferred embodiment are identically designated to other elements of vibration motor 1C which relate to another preferred embodiment, and the identical elements are not discussed in detail. Set forth below is a detailed description of the elements of the eccentric weight 100c and the holder 120c.

The basic configuration of vibration motor 1C which relates to another preferred embodiment is preferably identical to that of vibration motor 1A which relates to an exemplary preferred embodiment of the present invention, and is defined by a rotating portion which rotates on a shaft 75, and a stationary portion which generates power to rotate the rotating portion.

The stationary portion preferably includes a base 10, a case 40, a circuit board 60, an armature 70, and a shaft 75. Meanwhile, the rotating portion preferably includes a rotor magnet 90, a back yoke 80, an eccentric weight 100c, and a holder 120c. The rotating portion is preferably further provided with a sintering sleeve 85, which is a bearing, and a spacer 73.

Like the eccentric weight 100 shown in FIGS. 1 and 3, the eccentric weight 100c also includes a semicircular-shaped or substantially semicircular-shaped horizontal portion 101c. The circumferential edge of the horizontal portion 102c is defined by an arcuate-shaped circumferential edge 102c which is directed outwardly in a radial direction, and a lineal portion which is directed to the shaft 75 positioned at the center. The eccentric weight 100c also preferably includes a support opening 105c. Like the eccentric weight 100 provided to vibration motor 1A which relates to an exemplary preferred embodiment, there are two types of this support opening 105c, which are 105A as shown in FIGS. 3 and 105B as shown in FIG. 4.

The eccentric weight 100c is disposed where the arcuate-shaped circumferential edge 102c, which defines the horizontal portion 101c, is positioned, and is provided with a peripheral wall 109 which covers the outer circumference of the rotor magnet 90. However, the peripheral wall 109 can be provided as necessary, and it does not need to be provided depending on the specifications required by the vibration motor 1C.

The eccentric weight 100c preferably includes a second concave portion 111 at the upper surface of the horizontal portion 101c. The second concave portion 111 is disposed in between a circumferential edge 102c and the lineal portion in a radial direction of the horizontal portion 101c. In a plane view, the second concave portion 111 preferably has, for example, a recess shape in a circular form, and is provided at one or more positions in a circumferential direction. Also, the second concave portion 111 can be, for example, an arcuate-shaped groove which is disposed in between the circumferential edge 102c and the lineal portion, and extends in a circumferential direction.

The holder 120c preferably includes a penetrated portion 121, an upper surface portion 123c, and a lower surface portion 127. At the upper surface portion 123c of this holder 120c, the resin which defines the holder 120c is partially in contact with the inner side of the second concave portion 111 of the eccentric weight 100c. Specifically, the upper surface portion 123c of the holder 120c preferably includes a second convex portion 128 which protrudes from the lower side of the upper surface portion 123c to the lower side.

This second convex portion 128 is in contact with the inner side of the second concave portion 111. When the holder 120c is molded with a molding apparatus (not illustrated), the second convex portion 128 is shaped by the resin entering into the inner side of the second concave portion 111 of the eccentric weight 100c which is set to a shaping frame. For this reason, the first convex portion and the second concave portion 111 correspond to each other in the aspects of position, number and shape.

The second concave portion 111 of vibration motor 1C, which relates to another preferred embodiment, is preferably provided at the upper portion of the horizontal portion 101c which defines the eccentric weight 100c, and the resin, which defines the holder 120c, is in contact with the inner side of the second concave portion 111. With such feature, the holder 120c is able to support the eccentric weight 100c more strongly, compared to a configuration without the second concave portion 111 and the second convex portion 128.

Figure 12:
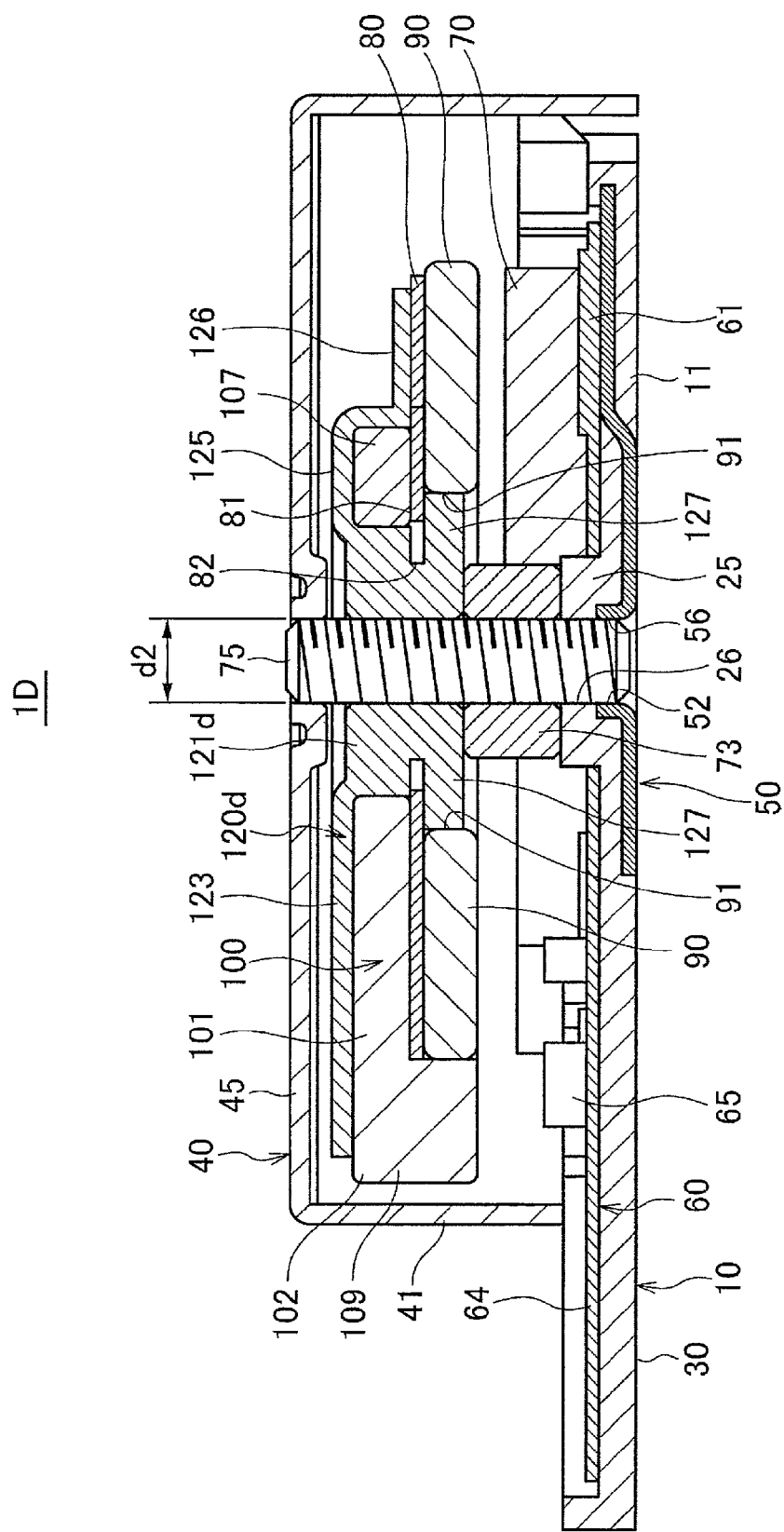
FIG. 12 is a sectional view of a vibration motor according to another preferred embodiment of the present invention.

Next, set forth below is an explanation of vibration motor 1D which relates to another preferred embodiment with reference to FIG. 12. This vibration motor 1D which relates to another preferred embodiment provides a bearing and a holder 120d as a single member with the resin which defines the holder 120d. That is, in the vibration motor 1D which relates to another preferred embodiment, the construction of the holder 120d is different from that of the vibration motor 1A which relates to an exemplary preferred embodiment of the present invention; however, apart from the holder 120d, other elements are preferably identical. For this reason, apart from the holder 120d, the elements of vibration motor 1D which relate to another preferred embodiment shown in FIG. 12 are designated with symbols identical to each element of vibration motor 1A which relates to an exemplary preferred embodiment of the present invention and each of those identical elements will not be discussed in detail. Set forth below is a detailed description of the construction of the holder 120d.

The basic configuration of vibration motor 1D which relates to another preferred embodiment is preferably identical to that of vibration motor 1A which relates to an exemplary preferred embodiment of the present invention, and is defined by a rotating portion which rotates on a shaft 75, and a stationary portion which generates the power to rotate the rotating portion.

The stationary portion preferably includes a base 10, a case 40, a circuit board 60, an armature 70, and a shaft 75. Meanwhile, the rotating portion preferably includes a rotor magnet 90, a back yoke 80, an eccentric weight 100b, and a holder 120d. The rotating portion is also preferably provided with a spacer 73. However, the rotating portion is not provided with an independent bearing.

The holder 120d preferably includes a penetrated portion 121d, an upper surface portion 123, and a lower surface portion 127. An inner diameter d2 of the penetrated portion 121d of this holder 120d is preferably identical to the outer diameter of the shaft 75 or slightly bigger than the outer diameter of the shaft 75. For this reason, the holder provides the function of a bearing. Vibration motor 1D is preferably used in a temperature range of about −20° C. or higher and about 60° C. or lower, for example. The holder 120d needs to rotate smoothly with respect to the shaft 75 in this temperature range. For this reason, the clearance between inner diameter d2 of the penetrated portion 121*d* and the outer circumference of the shaft 75 is preferably in a range of 0 μm or longer and about 25 μm or shorter, for example.

With the above-described construction provided to the penetrated portion 121*d* of the holder 120*d*, the penetrated portion 121*d* itself can define and function as a bearing, and rotatably support the holder 120*d* directly with respect to the shaft 75. For this reason, the bearing, for example, the sintering sleeve 85 provided to vibration motor 1A which relates to an exemplary preferred embodiment of the present invention becomes unnecessary, and thus the number of component pieces can be reduced. Also, since it becomes unnecessary to insert the bearing into the penetrated portion 121*d* of the holder 120*d* by indentation, etc., the number of manufacturing process can also be reduced.

Figure 13:
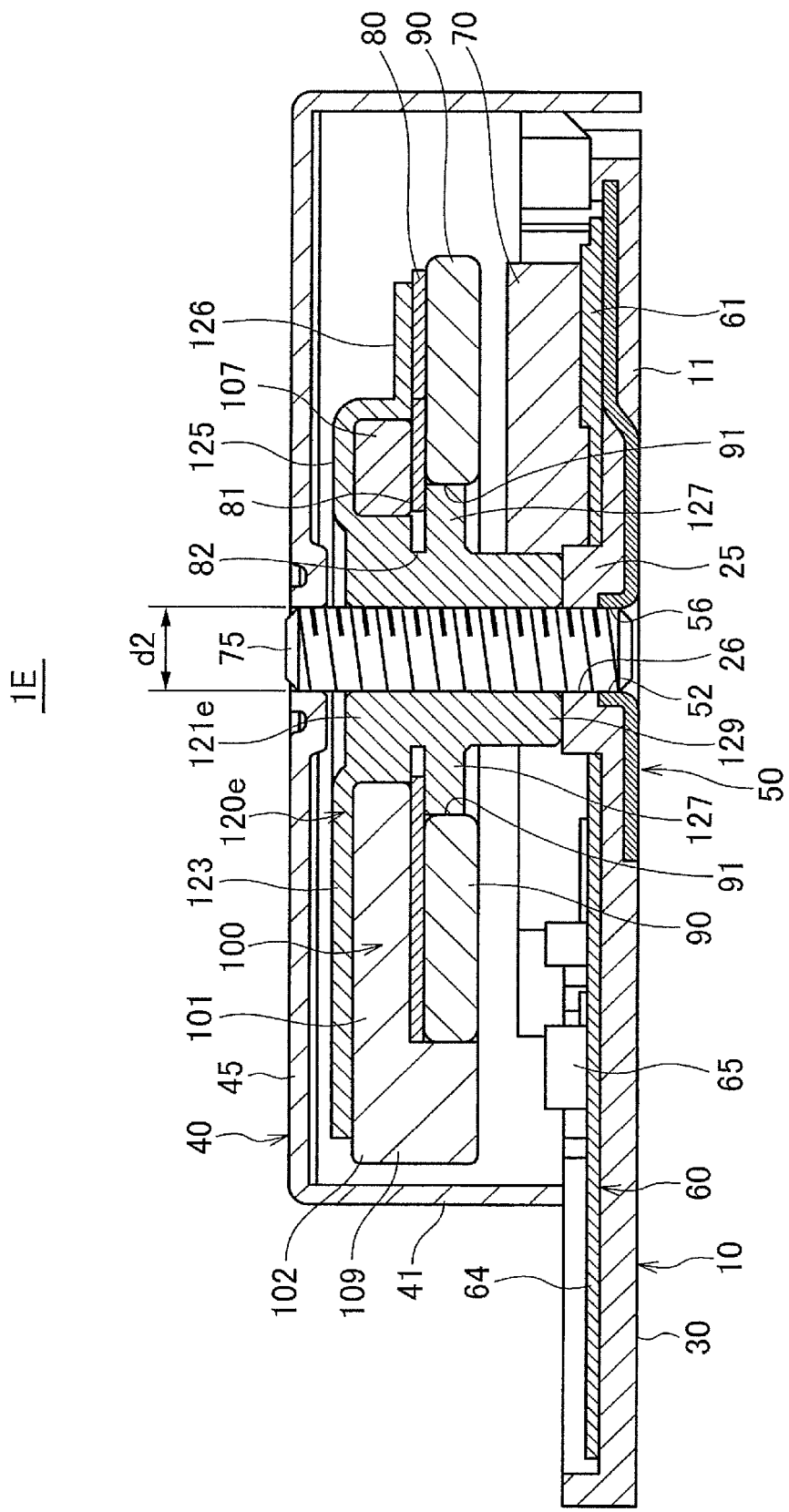
FIG. 13 is a sectional view of a vibration motor according to another preferred embodiment of the present invention.

Next, set forth below is an explanation of vibration motor 1E which relates to another preferred embodiment with reference to FIG. 13. This vibration motor 1E which relates to another preferred embodiment provides a bearing and a spacer as a single member together with a holder 120*e* by the resin which defines the holder 120*e*. That is, in vibration motor 1E which relates to another preferred embodiment, the construction of the holder 120*e* is different from that of vibration motor 1A which relates an exemplary preferred embodiment of the present invention; however, apart from the holder 120*e*, other elements are preferably identical. For this reason, apart the holder 120*e*, the elements of vibration motor 1E which relate to another preferred embodiment shown in FIG. 13 are designated with symbols identical to each element of vibration motor 1A which relates to an exemplary preferred embodiment of the present invention and each of those identical elements will not be discussed in detail. Set forth below is a detailed description of the constitution of the holder 120*e*.

The basic configuration of vibration motor 1E which relates to another preferred embodiment is preferably identical to that of vibration motor 1A which relates to an exemplary preferred embodiment of the present invention, and is defined by a rotating portion which rotates on a shaft 75, and a stationary portion which generates the power to rotate the rotating portion.

The stationary portion preferably includes a base 10, a case 40, a circuit board 60, an armature 70, and a shaft 75. Meanwhile, the rotating portion preferably includes a rotor magnet 90, a back yoke 80, an eccentric weight 100, and a holder 120*e*. However, the rotating portion is not provided with an independent bearing.

The holder 120*e* preferably includes a penetrated portion 121*e*, an upper surface portion 123, and a lower surface portion 127. An inner diameter d2 of the penetrated portion 121*e* of this holder 120*e* is identical to the outer diameter of the shaft 75 or slightly bigger than the outer diameter of the shaft 75. For this reason, the penetrated portion 121*e* is configured to provide and perform a function of a bearing. This vibration motor 1E is preferably used in a temperature range of about −20° C. or higher and about 60° C. or lower, for example. For this reason, like vibration motor 1D which relates to another preferred embodiment, the clearance between inner diameter d2 of the penetrated portion 121*e* and the outer circumference of the shaft 75 is in a range of 0 μm or longer and about 25 μm or shorter, for example.

Also, the penetrated portion 121*e* of the holder 120*e* preferably includes an extension 129 which extends axially lower than the lower surface portion 127, that is, extends to the base 10. The extension 129 is preferably in contact with the upper end of a projection 25 of the base 10 and functions as a spacer. That is, the extension 129 is configured to perform a positioning of an axial direction in which the rotor magnet 90, the back yoke 80, the eccentric weight 100, and the shaft 75 of the holder 120*e* extend.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor, comprising: a plate-shaped base; a case including a cylindrical circumferential surface portion, and a top surface portion closing an axially upper end side of the circumferential surface portion, the cylindrical circumferential surface portion being fixed to the base; a shaft including a lower axial end fixed to the base, and an upper axial end fixed to the top surface portion; a ring-shaped rotor magnet that surrounds the shaft and includes an opening at a center thereof; an armature that is disposed on the base and faces the rotor magnet with a gap in an axial direction; a ring-shaped back yoke that is in contact with an upper surface of the rotor magnet, expands in a radial direction, and includes an opening at a center thereof; an eccentric weight has a center of gravity that is located radially outside the shaft; and a holder that is a member made of resin and holds the ring-shaped back yoke and the eccentric weight; wherein the back yoke includes an overhang portion that extends inwardly in the radial direction farther than an inner side edge of the opening of the rotor magnet; the holder includes a penetrated portion that is a tube-shaped portion positioned at an axially inner side of the rotor magnet and that extends in the axial direction surrounding the shaft, an upper surface portion that expands radially outwardly from an upper side of the penetrated portion to cover at least a portion of an upper surface of the eccentric weight, and a lower surface portion that expands radially outwardly from the lower side of the penetrated portion to cover at least a portion of a lower surface of the overhang portion; and the shaft rotatably supports the holder that includes the penetrated portion.

2. The vibration motor according to claim 1, wherein an inner edge of the back yoke includes a first concave portion spaced by a distance from a center axis of the shaft farther than an adjacent region on left and right sides in the circumferential direction; and resin that defines the penetrated portion contacts an inner side of the first concave portion.

3. The vibration motor according to claim 2, wherein the eccentric weight includes a support opening that surrounds the shaft; and the support opening surrounds the shaft in a range greater than 180.degree.

4. The vibration motor according to claim 3, wherein the support opening surrounds an entire circumference of the shaft.

5. The vibration motor according to claim 1, wherein the eccentric weight includes a support opening that supports the shaft; and the support opening surrounds the shaft in a range greater than 180.degree.

6. The vibration motor according to claim 5, wherein the support opening surrounds an entire circumference of the shaft.

7. The vibration motor according to claim 1, wherein a portion of the eccentric weight covers an inner circumferential edge of the back yoke.

8. The vibration motor according to claim 5, wherein a portion of the eccentric weight covers an inner circumferential edge of the back yoke.

9. The vibration motor according to claim 2, wherein the eccentric weight includes a second concave portion at the upper surface thereof; and resin that defines the holder contacts an inner side of the second concave portion.

10. The vibration motor according to claim 1, wherein the eccentric weight includes a second concave portion at the upper surface thereof; and resin that defines the holder contacts an inner side of the second concave portion.

11. The vibration motor according to claim 6, wherein the eccentric weight includes a second concave portion at the upper surface thereof; and resin that defines the holder contacts an inner side of the second concave portion.

12. The vibration motor according to claim 2, wherein an inner diameter of the penetrated portion is equal to or larger than an outer diameter of the shaft.

13. The vibration motor according to claim 8, wherein an inner diameter of the penetrated portion is equal to or larger than an outer diameter of the shaft.

14. The vibration motor according to claim 2, wherein the holder includes a sintered sleeve provided at an inner side.

15. The vibration motor according to claim 2, wherein the upper surface portion of the holder includes a recess that is defined by a dented portion at a center side of the holder.

16. The vibration motor according to claim 15, wherein an inner diameter of the recess is smaller than an outer diameter of the penetrated portion at the upper surface portion of the holder.

17. The vibration motor according to claim 2, wherein a bottom of the recess is positioned at a lower side than an upper portion of the eccentric weight.

18. The vibration motor according to claim 2, wherein the back yoke includes a flat plate.

19. The vibration motor according to claim 2, wherein a portion of the eccentric weight covers an outer circumference of the rotor magnet.

* * * * *